United States Patent [19]
Schaaf et al.

[11] Patent Number: 6,112,153
[45] Date of Patent: Aug. 29, 2000

[54] USER INTERFACE FOR SELECTING DESTINATIONS BY ADDRESS IN A VEHICLE NAVIGATION SYSTEM

[75] Inventors: David T. Schaaf, Los Angeles; Kerry M. White; Ji-Bih Lee, both of Rancho Palos Verdes, all of Calif.

[73] Assignee: Alpine Electronics, Inc., Japan

[21] Appl. No.: 08/929,387

[22] Filed: Sep. 15, 1997

[51] Int. Cl.[7] .................................................. G06F 17/30
[52] U.S. Cl. .......................... 701/200; 701/202; 701/208; 707/100
[58] Field of Search .................................. 701/200, 201, 701/202, 208; 340/539, 531; 707/100, 104, 200

[56] References Cited

U.S. PATENT DOCUMENTS 5,680,312  10/1997  Oshizawa et al. ...................... 701/202
5,819,200  10/1998  Tamai et al. ............................ 701/208

*Primary Examiner*—William A. Cuchlinski, Jr.
*Assistant Examiner*—Arthur D. Donnelly
*Attorney, Agent, or Firm*—Brinks Hofer Gilson & Lione

[57] ABSTRACT

A navigation system user interface identifies and displays a list of all addresses which contain address components in conformity with the user provided "city name", "street base name" and "house number" and prompts the user to choose an address from the list thus provided. Alternatively, the interface generates a list of all the city names which contain valid addresses in conformity with the user provided "street base name" and "house number". The system, subsequently, displays a list of all possible addresses with components matching those entered/selected by the user and prompts the user to select an address from the list thus provided.

16 Claims, 3 Drawing Sheets

USER INTERFACE FOR SELECTING DESTINATIONS BY ADDRESS IN A VEHICLE NAVIGATION SYSTEM

FIELD OF THE INVENTION

The present invention relates to a user interface for a vehicle navigation system, more particularly, to a user interface for identifying and displaying destination addresses.

DESCRIPTION OF THE RELATED ART

Vehicle navigation systems are well known, see e.g. Yamada et al., U.S. Pat. No. 4,926,336; Link et al., U.S. Pat. No. 5,270,937; and Ichikawa, U.S. Pat. No. 5,410,485, all incorporated by reference. Such navigation systems generally perform two major functions. One function is to identify the optimum route from the present location to a desired destination, a process which is generally referred to as route guidance. The other function is to display a map of both the present location and of the identified route. This display is usually in the form of a map displayed on a small screen installed in the vehicle.

As is well known, typically in such systems a database is provided of the road network. This database lists all of the roads for instance in one state or in some other fairly large geographical area. This representation of the road network is sometimes referred to as a digitized map.

The navigation apparatus of the type used in the U.S.A. displays guidance pictures during navigation. It detects the position of the vehicle, reads out map data corresponding to the vehicle position from a map data base such as a CD-ROM, displays, by using map data, an enlarged diagram of an approached intersection or a branching point, which may exist in a guide route in a predetermined distance range from the present vehicle position, along with an arrow indicating a heading direction and performs speech guidance by designating the heading direction.

To perform its above mentioned functions, current navigation systems require a user to first identify the city name followed by the street base name. After the selection of the street name, the system displays a list of all possible road types, suffixes or prefixes that in conjunction with the selected full street name constitute valid addresses. At this point the user must select a road type from the list, subsequent to which the user must enter the house number of his desired destination. If the house number does not fall within a valid range of the house numbers for the selected street, the user must select another road type from the displayed list and repeat the process until the selected house number exists on the selected street.

The following example further illustrates this point:

EXAMPLE 1

100 Main St
Los Angeles, Calif.

To select the above address, a user must first enter the city name "Torrance" and then enter the street base name "Main", after which the system perform a search of its database and identifies and generates a list of all possible road types that in conjunction with the street name "Main" constitute valid addresses. Let's assume that the system identifies and displays the following three combinations of the valid road types and the street base name "Main" for the city of "Torrance":

Main St
Main Pl
Main Ave

Let's assume that the user selects "Main Pl" from the above list. The user must now enter the house number "100" after which the system performs a search of its map database to identify the desired location. If house number "100" does not exist in "Main Pl", the user must go back and select another road type for the street name "Main".

As is evident from the above examples, a disadvantage of many present navigation systems is that they require a user to know the complete address of the desired destination, including the road type ("Pl") and any prefix and/or any suffix associated with a street base name. Should a user fail to recall any component of an address, e.g. "St" of the above example 1, the user must guess that component; this is likely to lead to inefficiency and inconvenience.

Therefore, a need has arisen for a navigation system that is more flexible and can aid a user to identify all the components of an address, e.g. the road type and any prefix and/or a suffix associated with that address, more efficiently.

SUMMARY

In accordance with the present invention, a vehicle (or other) navigation system (i.e. mapping system) performs a search of its map database to identify and display a list of all addresses therein which contain address components in conformity with the user provided "city name", "street base name" and "house number", and prompts the user to select an address from the displayed list. Alternatively, the system allows the user to enter only a "street base name" and a "house number", forms the combination therefrom, whereby the system finds all possible city names containing that combination and subsequently generates and displays a list of the city names thus found. After the user selects a city name from the list, the system displays a second list containing all addresses in its database having components matching those entered/selected by the user and prompts the user to select an address from the second list.

Advantageously, in accordance with the present invention, the vehicle navigation system provides a substantially reduced list of possible valid addresses by requiring the user to select the road type and any prefixes/suffixes associated with the user's desired address at the final stages of the address selection process.

DETAILED DESCRIPTION

The names, numbers and other information, which in the aggregate conventionally constitute a street address, are hereafter referred to as address select components. In the discussion below it is understood that address select components conventionally include a house number, a street base name, a prefix which is a string of alphabetic character(s) preceding the street base name, a suffix which is a string of alphabetic character(s) succeeding the street base name, a road type and a city name.

Examples of the prefixes/suffixes recognized by the navigation system in accordance with the present invention, and which are of the type most commonly used in the United States are: "E", "N", "S", "W", "NE", "NW", "SE" and "SW".

Examples of the road types recognized by the navigation system and which are of the type most commonly used in the United States are: "St", "Ave", "Pl", "Blvd", "Rd" and "Dr". A street base name refers to the name of the street on which the desired destination (house, business, etc.) is located. For instance, the street base name of the following address is "Gramercy".

19145 Gramercy Pl
Torrance, Calif.

In accordance with the present invention, the navigation system helps a user fully identify a desired address according to one of the following two sequences:
1. City Name
2. Street Base Name
3. House Number
4. Road type and Affix (prefix/suffix)
or
1. Street Base Name
2. House Number
3. City Name
4. Road type and Affix (prefix/suffix)

Figure 1:
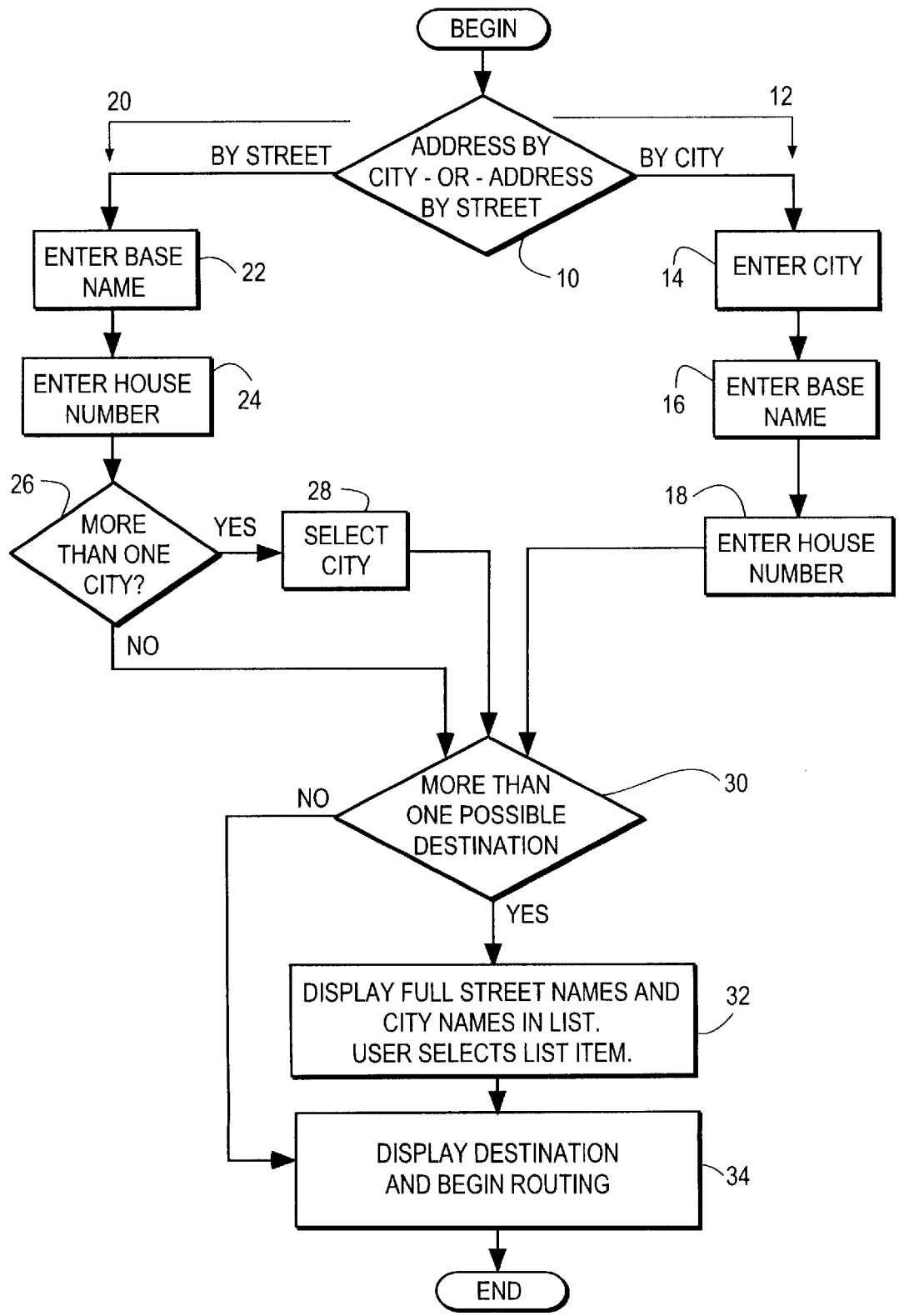
FIG. 1 shows a flowchart which delineates the sequence of steps performed by the navigation system to help a user identify the desired destination.

FIG. 1 shows a flowchart which delineates the sequence of steps performed by the navigation system to help a user identify the desired destination. In FIG. 1, the rectangular boxes designate system prompts or display stages and the diamond boxes designate decision points.

As can be seen from FIG. 1, the system, after a user activates the navigation system to find his destination, presents the user with an option to commence the address selection process, shown in the flowchart by decision point 10, by either entering a city name, path 12, or entering a street name, path 20. If the user knows the city name of his destination, the user chooses path 12 after which the system prompts the user to enter the "City Name", the "Street Base Name" and the "House Number" at steps 14, 16 and 18 respectively. Subsequently, at decision point 30, the system initiates a search of its conventional map database to identify all valid addresses therein that are an aggregation of the user provided "City Name", "Street Base Name" and "House Number" with the system known road types and road affixes. If the database search finds only one identifiable address, the system displays and selects that address and prompts the user to initiate the conventional route guidance to that address at step 34. If the database search finds more than one valid address, the system displays on its display screen a list of all fully identified addresses and prompts the user to select (using the keypad) an address from the list generated at step 32. Each address listed in step 32 is fully identified and includes all the address select components, including a valid road type and any road affixes associated with that address. After the user selects an address at step 32, the system moves to step 34, the operation of which is conventional and discussed earlier.

A user may not know or remember the city name of his desired destination. To accommodate such users, the system provides an alternative choice, path 20, at step 10 to help a user identify the name of his/her desired city. If path 20 is chosen, the user is prompted to enter the "Street Base Name" and the "House Number" at steps 22 and 24, respectively. At decision point 26, the system performs a search of its database to identify all possible cities that include the user provided "Street Base Name" and "House Number". If the search identifies a plurality of city names in conformity with the above characteristics, the system displays a list of the city names and prompts the user to select a city name from the list thus found at step 28. After the user's selection of a city name at step 28, the system enters step 30 to continue the address selection process, as described earlier. If the search conducted at step 26 finds only one identifiable city, the system automatically selects that city and moves to step 30.

The following example further illustrates how the user interface, in accordance with the present invention, aids a user to identify an address. In this example, it is assumed that a user does not recall the road type "Pl" of his desired destination which is:

19145 Gramercy Pl
Torrance Calif.

Figure 2A:
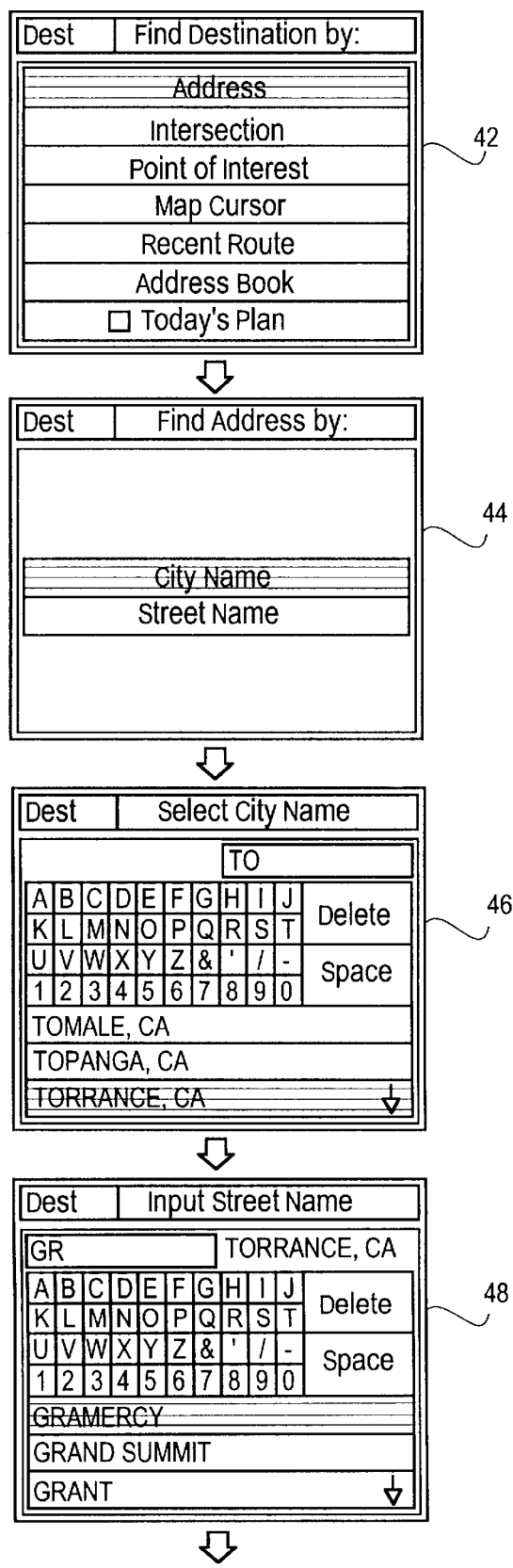
FIGS. 2A and 2B illustrate the sequence of screens displayed to help a user identify a desired destination as in FIG. 1.

After the user presses the "menu" key located on the navigation system remote hand held unit, the system displays for the user conventionally a menu of options to help the user find his/her desired destination, as shown at stage 42 of FIG. 2A. The user selects the option "Address", as designated by the highlighted area, from the displayed menu to initiate an address selection process. At stage 44, corresponding to decision point 10 in the flowchart of FIG. 1, the system prompts the user to choose either a city name or a street base name as the starting point of the address selection process. The user responds by selecting the option "City Name", as is designated by the highlighted area.

Figure 2B:
Figure 2B:
Figure 2B:
Figure 2B:

At stage 46, corresponding to step 14 in the flowchart of FIG. 1, the "Select City Name" input screen appears and the user selects letters from the keypad to enter the desired city name. Each time the user inputs an alphabetic character as a part of the desired city name, a list displaying cities with names containing those characters is updated in alphabetical order. The user selects the city name "Torrance" from the updated list at stage 46, as shown by the highlighted area. At stage 48, corresponding to step 16 in the flowchart of FIG. 1, the "Input Street Name" input screen appears and the user selects letters from the keypad to enter the desired street name. Each time the user inputs an alphabetic character as a part of the desired street name, a list displaying streets with names containing those characters is updated in alphabetical order. This list only contains street base names, excluding any affixes or road types. The user can scroll up or down the list provided by the system, from which the user selects the desired street base name "Gramercy", as is shown by the highlighted area at stage 48 of FIG. 2A. Referring to FIG. 2B, at stage 50, corresponding to step 18 in the flowchart of FIG. 1, the "Input Address Number" input screen appears and the user, using the keypad, enters the desired house number "100" and presses the keypad key "Done." The house number must fall in the displayed range.

With this information, (corresponding to decision point 30 in the flowchart of FIG. 1) the system initiates a search of its map database to identify all possible road affixes, and road types that, in combination with the city name "Torrance", the street base name "Gramercy" and the house number "100", constitute valid addresses. At stage 52, corresponding to step 32 in the flowchart of FIG. 1, the system displays all such valid addresses from which the user selects his desired. As can be seen from stage 52, the address select components responsible for distinguishing the three possible addresses in this example are the road types and the prefixes. At stage 54, the complete address has been identified and the user must press the "OK to PROCEED" key on the keypad to initiate the route guidance process (corresponding to step 34 of the flowchart in the FIG. 1) If, based on the user provided inputs, a search of the system database finds only one valid address, the system automatically selects and displays that address, highlights the "OK to PROCEED" key, and prompts the user to initiate the thereinafter conventional route guidance process to that address, as shown in stage 56 of the FIG. 2B, corresponding to step 34 in the flowchart of FIG. 1.

Therefore, the user interface, in accordance with the present invention, advantageously allows a user to identify the road type and the road affixes associated with his/her desired destination address at the final stage of the address selection process. The navigation system performs a much narrowed database search and eliminates the number of iterations that a user must go through in order to fully identify his/her desired address.

The present invention is included in a computer software (code) operating on the microprocessor in the system. The actual computer software code is not shown since such can easily be written in light of the present disclosure by one of ordinary skill in the art. The computer software can be written in a variety of computer languages.

This disclosure is illustrative and not limiting; further modification will be apparent to one skilled in the art in light of this disclosure and are intended to fall within the scope of the appended claims.

We claim:

1. In a navigation system, a user interface for identifying and displaying a list of only those addresses in a database having in common at least one user selected address component, wherein the address components include a city name, a house/business number, a street base name, a road type, and a prefix or a suffix associated with an address.

2. A user interface according to claim 1, wherein said user selected address component is a street base name.

3. A user interface according to claim 1, wherein said user selected address component is a house number.

4. A user interface according to claim 1, wherein said user selected address components are a street base name and a house number.

5. A user interface according to claim 4, wherein the user interface generates and displays a list containing the name of cities for which said street base name and said house number are valid address components; further comprising means for said user to select a city name from said list.

6. A user interface according to claim 5, wherein if said street base name and said house number are valid address select components for only one city, the user interface displays and selects that city.

7. A user interface according to claim 1, wherein said user selected address components are a city name, a street base name and a house number.

8. A user interface according to claim 7, wherein said user interface generates and displays a list containing addresses for which said city name and said street base name and said house number are valid address components; further comprising means for said user to select an address from said list.

9. A user interface according to claim 8, wherein if said city name and said street base name and said house number are valid address components of only one address, the user interface displays and selects that address.

10. A user interface according to claim 6, wherein said user interface generates and displays a list containing addresses for which said system selected city name and said user provided street base name and house number are valid address components; further comprising means for said user to select an address from said list.

11. A user interface according to claim 10, wherein if said city name and said street base name and said house number are valid address components of only one address, the user interface displays and selects that address.

12. A user interface according to claim 5, wherein said user interface generates and displays a list containing addresses for which said user selected city name and said user provided street base name and house number are valid address components; further comprising means for said user to select an address from said list.

13. A user interface according to claim 12, wherein if said city name and said street base name and said house number are valid address components of only one address, the user interface displays and selects that address.

14. A user interface according to claim 2, wherein upon a user entry into the navigation system of each character of a street base name, a list of all street base names containing those characters, in the sequence entered, is updated and displayed.

15. A user interface according to claim 7, wherein upon a user entry into the navigation system of each character of a city name, a list of all city names containing those characters, in the sequence entered, is updated and displayed.

16. A method of determining a desired address, comprising the steps of:

generating a list of only addresses having in common at least one user selected address component, wherein the address components include a city name, a house/business number, a street base name, a road type, and a prefix or a suffix associated with an address; and displaying said list for the user to choose an address therefrom.

* * * * *

(12) EX PARTE REEXAMINATION CERTIFICATE (6044th)
United States Patent
Schaaf et al.

(10) Number: US 6,112,153 C1
(45) Certificate Issued: Dec. 11, 2007

(54) USER INTERFACE FOR SELECTING DESTINATIONS BY ADDRESS IN A VEHICLE NAVIGATION SYSTEM

(75) Inventors: David T. Schaaf, Los Angeles, CA (US); Kerry M. White, Rancho Palos Verdes, CA (US); Ji-Bih Lee, Rancho Palos Verdes, CA (US)

(73) Assignee: Alpine Electronics, Inc., Iwaki-Shi, Fukushima (JP)

Reexamination Request:
No. 90/008,551, Apr. 10, 2007

Reexamination Certificate for:
Patent No.: 6,112,153
Issued: Aug. 29, 2000
Appl. No.: 08/929,387
Filed: Sep. 15, 1997

(51) Int. Cl.
*G01C 21/34* (2006.01)
*G01C 21/36* (2006.01)
*G06F 17/30* (2006.01)

(52) U.S. Cl. ............... 701/200; 701/202; 701/208; 707/100

(58) Field of Classification Search ............... None
See application file for complete search history.

(56) References Cited

U.S. PATENT DOCUMENTS

| 5,072,395 | A | | 12/1991 | Bliss et al. |
| 5,191,532 | A | | 3/1993 | Moroto et al. |
| 5,680,312 | A | * | 10/1997 | Oshizawa et al. ......... 701/202 |
| 5,819,200 | A | | 10/1998 | Tamai et al. |
| 5,825,306 | A | * | 10/1998 | Hiyokawa et al. ......... 701/209 |
| 5,832,408 | A | | 11/1998 | Tamai et al. |
| 5,839,088 | A | | 11/1998 | Hancock et al. |
| 5,845,226 | A | | 12/1998 | Ajima |
| 5,941,930 | A | | 8/1999 | Morimoto et al. |
| 5,987,375 | A | | 11/1999 | Tamai |
| 6,038,508 | A | | 3/2000 | Maekawa et al. |
| 6,556,918 | B2 | | 4/2003 | Stangier et al. |

* cited by examiner

*Primary Examiner*—Peter C. English

(57) ABSTRACT

A navigation system user interface identifies and displays a list of all addresses which contain address components in conformity with the user provided "city name", "street base name" and "house number" and prompts the user to choose an address from the list thus provided. Alternatively, the interface generates a list of all the city names which contain valid addresses in conformity with the user provided "street base name" and "house number". The system, subsequently, displays a list of all possible addresses with components matching those entered/selected by the user and prompts the user to select an address from the list thus provided.

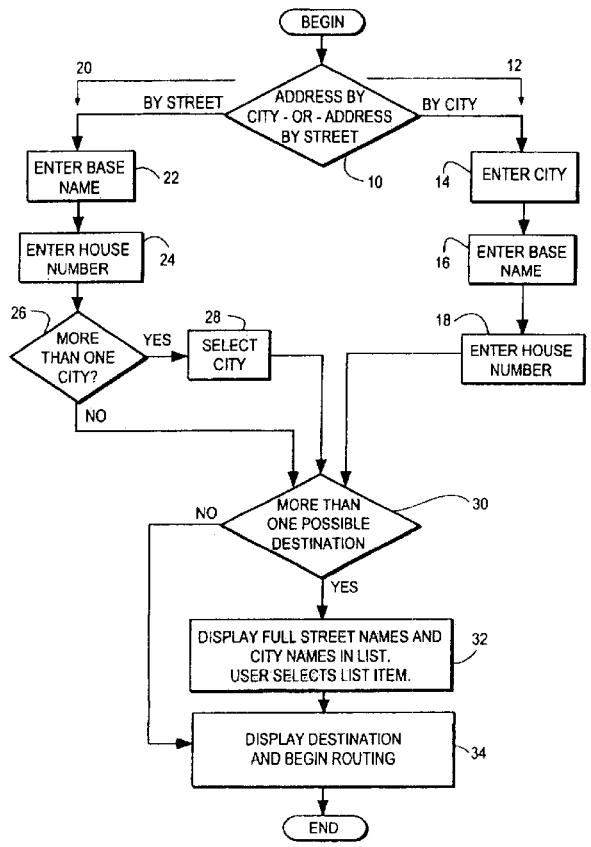

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2 and 3 are cancelled

Claims 1, 4–7, 14 and 16 are determined to be patentable as amended.

Claims 8–13 and 15, dependent on an amended claim, are determined to be patentable.

New claims 17–45 are added and determined to be patentable.

1. In a navigation system, a user interface for identifying and displaying a list of only those addresses in a database having in common at least one user selected address component, wherein the address components include a city name, a house/business number, a street base name, a road type, and a prefix or a suffix associated with an address, *and the at least one user selected address component includes a street base name but does not include both of a road type and a prefix or a suffix associated with an address*.

4. [A user interface according to claim 1.] *In a navigation system, a user interface for identifying and displaying a list of only those addresses in a database having in common at least one user selected address component, wherein the address components include a city name, a house/business number, a street base name, a road type, and a prefix or a suffix associated with an address, and* wherein said user selected address components are a street base name and a house number.

5. A user interface according to claim 4, wherein the user interface generates and displays a list containing the [name] *names* of cities for which said street base name and said house number are valid address components; further comprising means for said user to select a city name from said list.

6. A user interface according to claim 5, wherein if said street base name and said house number are valid address [select] components for only one city, the user interface displays and selects that city.

7. [A user interface according to claim 1.] *In a navigation system, a user interface for identifying and displaying a list of only those addresses in a database having in common at least one user selected address component, wherein the address components include a city name, a house/business number, a street base name, a road type, and a prefix or a suffix associated with an address, and* wherein said user selected address components are a city name, a street base name and a house number.

14. A user interface according to claim [2] *1*, wherein upon a user entry into the navigation system of each character of a street base name, a list of all street base names containing those characters, in the sequence entered, is updated and displayed.

16. A method of determining a desired address, comprising the steps of:
generating a list of only addresses having in comnnon at least one user selected address component, wherein the address components include a city name, a house/business number, a street base name, a road type, and prefix or a suffix associated with an address, *and the at least one user selected address component includes a street base name but does not include both of a road type and a prefix or a suffix associated with an address*; and
displaying said list for the user to choose an address therefrom.

*17. A user interface according to claim 1, wherein each address in the displayed list includes a house/business number, a street base name, a road type, and a prefix/suffix associated with the address.*

*18. A user interface according to claim 17, wherein each address in the displayed list further includes a city name.*

*19. A method of determining a desired address according to claim 16, wherein upon a user entry of each character of a street base name, a list of all street base names containing those characters, in the sequence entered, is updated and displayed.*

*20. A method of determining a desired address according to claim 16, wherein said user selected address components are a street base name and a house/business number.*

*21. A method of determining a desired address according to claim 20, further comprising generating and displaying a list containing the names of cities for which said street base name and said house/business number are valid address components; and receiving a user selection of a city name from said list.*

*22. A method of determining a desired address according to claim 21, further comprising generating and displaying a list containing addresses for which said user selected city name, street base name, and house/business number are valid address components; and receiving a user selection of an address from said list.*

*23. A method of determining a desired address according to claim 22, wherein if said city name, street base name, and house/business number are valid address components of only one address, the method further comprises automatically selecting that address.*

*24. A method of determining a desired address according to claim 21, wherein if said street base name and said house/business number are valid address components of only one city, the method further comprises automatically selecting that city.*

*25. A method of determining a desired address according to claim 24, further comprising generating and displaying a list containing addresses for which said selected city name, street base name, and house/business number are valid address components; and receiving a user selection of an address from said list.*

*26. A method of determining a desired address according to claim 25, wherein if said selected city name, street base name, and house/business number are valid address components of only one address, the method further comprises automatically selecting that address.*

*27. A method of determining a desired address according to claim 16, wherein said user selected address components are a city name, a street base name and a house/business number.*

28. A method of determining a desired address according to claim 27, wherein upon a user entry of each character of a city name, a list of all city names containing those characters, in the sequence entered, is updated and displayed.

29. A method of determining a desired address according to claim 27, further comprising generating and displaying a list containing addresses for which said city name, street base name, and house/business number are valid address components; and receiving a user selection of an address from said list.

30. A method of determining a desired address according to claim 29, wherein if said city name, street base name, and house/business number are valid address components of only one address, the method further comprises automatically selecting that address.

31. A method of determining a desired address according to claim 16, wherein each address in the displayed list includes a house/business number, a street base name, a road type, and a prefix/suffix associated with the address.

32. A method of determining a desired address according to claim 31, wherein each address in the displayed list further includes a city name.

33. A method of determining a desired address, wherein address components include a city name, a house/business number, a street base name, a road type, and a prefix or a suffix associated with an address, the method comprising the steps of:

receiving user selected address components including a street base name and a house/business number, but not including both of a road type and a prefix or a suffix associated with an address;

generating a list of only addresses in a database having in common the received user selected address components;

displaying said list, wherein an address on said list includes a house/business number, a street base name, a road type and a prefix/suffix associated with the address; and receiving a user selection of an address from said list.

34. A method of determining a desired address according to claim 33, wherein upon a user entry of each character of a street base name, a list of all street base names containing those characters, in the sequence entered, is updated and displayed.

35. A method of determining a desired address according to claim 33, wherein the received user selected address components further include a city name.

36. A method of determining a desired address according to claim 35, wherein upon a user entry of each character of a city name, a list of all city names containing those characters, in the sequence entered, is updated and displayed.

37. A method of determining a desired address according to claim 33, further comprising after the first receiving step:

generating and displaying a list containing the names of cities for which said street base name and said house/business number are valid address components; and receiving a selection of a city name from said list of cities.

38. A method of determining a desired address according to claim 33, wherein each address in the displayed list further includes a city name.

39. A method of determining a desired address, wherein address components include a city name, a house/business number, a street base name, a road type, and a prefix or a suffix associated with an address, the method comprising the steps of:

receiving user selected address components of only a city name, a street base name, and house/business number;

searching a database to identify addresses containing address components in conformity with the selected address components;

generating a list of only addresses having in common the selected address components; and displaying said list for a user to choose an address therefrom, wherein an address on the list includes any road type and a prefix/suffix associated with the address.

40. A method of determining a desired address according to claim 39, wherein the receiving step comprises:

receiving a selected street base name and a selected house/business number;

generating and displaying a list containing the names of cities for which said street base name and said house/business number are valid address components; and receiving a selection of a city name from said list of cities.

41. A method of determining a desired address according to claim 39, further comprising:

receiving a selection of an address from the displayed list; and identifying an optimum route from a present location to the selected address.

42. A method of determining a desired address according to claim 41, further comprising displaying a map of the present location and the identified route.

43. A method of determining a desired address according to claim 41, further comprising displaying a diagram of an intersection or branching point on the identified route when the present location approaches the intersection or branching point within a predetermined distance range, and displaying an arrow indicating a heading direction.

44. A method of determining a desired address according to claim 39, wherein each address in the displayed list includes a house/business number, a street base name, a road type, and a prefix/suffix associated with the address.

45. A method of determining a desired address according to claim 44, wherein each address in the displayed list further includes a city name.

* * * * *